UNITED STATES PATENT OFFICE.

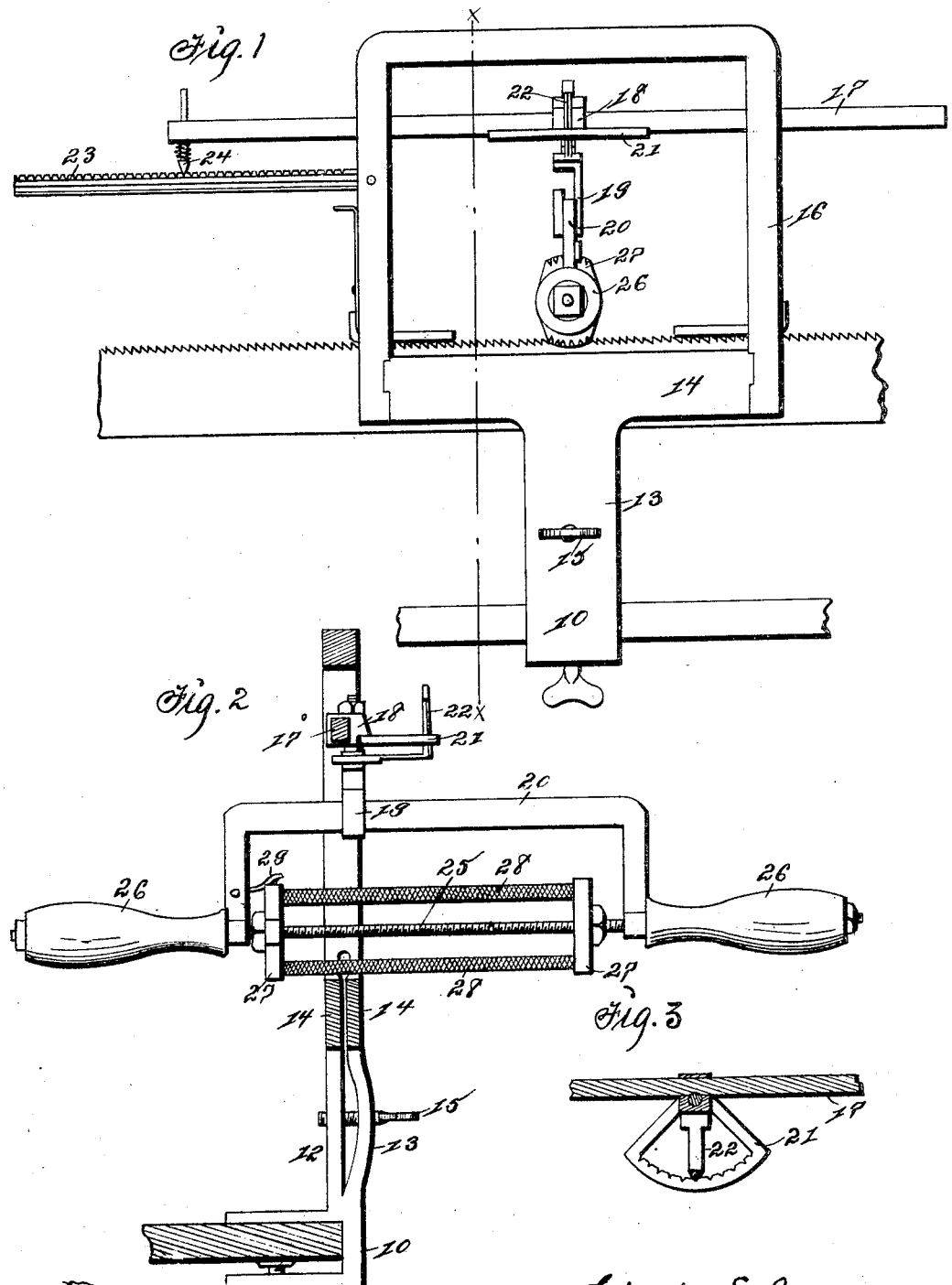

CHARLES E. GROVER, OF WAUTOMA, WISCONSIN.

SAW-FILING MACHINE.

No. 804,192.      Specification of Letters Patent.      Patented Nov. 7, 1905.

Application filed July 22, 1904. Serial No. 217,719.

*To all whom it may concern:*

Be it known that I, CHARLES E. GROVER, a citizen of the United States, residing at Wautoma, in the county of Waushara and State of Wisconsin, have invented a new and useful Saw-Filing Machine, of which the following is a specification.

My object is to provide a machine specially adapted for supporting, adjusting, and fastening a saw and also for supporting, adjusting, and manually operating a file as required to apply a file at different angles to saw-teeth.

A further object is to detachably connect parts of a frame for supporting a saw and a file-holder to facilitate packing, storing, and shipping the complete device and to adjustably connect a plurality of files with the file-holder.

My invention consists in the construction of elements and subcombinations, as hereinafter set forth, pointed out in my claims, and illustrated in the accompanying drawings, in which—

Figure 1 is a side view of the machine and shows a saw-blade clamped fast therein as required in practical use. Fig. 2 is a transverse sectional view on the line $x\ x$ of Fig. 1 and shows the file-holder and means for suspending and adjusting it relative to a saw-blade clamped fast in the machine as shown in Fig. 1. Fig. 3 is a detail view of the device for adjusting the file-holder as required for applying the file to saw-teeth at various angles relative to the saw-blade.

The numeral 10 designates a clamp consisting of a three-sided frame adapted to be detachably fastened to the edge portion of a table or other support for my machine. It has integral uprights 12 and 13, and each of the uprights has a cross-head 14 at its top that are provided with tenons on their ends adapting them to be detachably connected with a frame, as shown in Fig. 1. The upright 14 is bowed outward and flexible, so that it can be adjusted relative to the upright 12 by means of a set-screw 15, as required for clamping a saw between the cross-heads 14, as shown in Fig. 1.

A three-sided frame 16 for supporting a saw-holder is fixed to the lower ends of the vertical parallel parts of the frame, and said lower ends are bifurcated to allow a saw-blade to pass therethrough. Their lower inside edges are provided with notches to admit the tenons on the ends of the cross-heads 14, as shown in Fig. 1. A straight bar 17 is extended through apertures in the frame and slidably connected therewith for supporting a file-holder in such a manner that the bar can be moved longitudinally. A slide 18 is placed on the bar 17 and a hanger 19 adjustably connected with the slide for suspending a file-holder 20, as shown in Fig. 1, so that the file-holder can be reciprocated and inclined laterally and also vertically. A triangular-shaped gage 21 is fixed to the slide 18 and a pointer 22 to the hanger 20, as shown in Figs. 2 and 3, for regulating the inclination of the file-holder relative to a saw clamped fast in the frame, as shown in Fig. 1.

A gage 23 is fixed to the frame 16 and a pointer 24 attached to the bar 17 for regulating the movement of the saw relative to the size of the saw-teeth or spaces between them.

A screw 25 extends between the handles 26 at the ends of the file-holder 20, and file-clamps 27 are adjustable on the screw 25 and adapted to engage the ends of files 28 as required to retain the files in parallel position with the screw 25. One of the clamps 27 has notches in its ends, and a spring-detent 29 engages the notches as required to retain the files stationary relative to the file-holder when the file-holder is reciprocated by the operator when filing a saw.

Having thus set forth the purpose of my invention and the construction and function of each part, the practical operation and utility thereof will be obvious to persons familiar with the art to which it pertains, and

What I claim as new, and desire to secure by Letters Patent, is—

1. In a saw-filing machine, a clamp, adapted to be fastened to a table, having a straight upright and a bowed upright and a cross-head at the top of each upright provided with tenons on their ends for detachably connecting a three-sided frame therewith and a set-screw extended through the uprights for adjusting the cross-heads relative to each other for fastening a saw-blade in combination with a three-sided frame, having bifurcated ends and mortises to admit the tenons on the ends of the cross-heads, in the manner set forth for the purposes stated.

2. In a saw-filing machine, a three-sided frame having apertures in its parallel uprights, a straight bar slidably connected with the parallel vertical parts of the frame, a file-holder on the bar, a pointer carried at one end of the straight bar, a gage fixed to the frame to extend outward therefrom in a plane below and parallel with the slidable bar, in the manner set forth for the purposes stated.

3. In a saw-filing machine, a three-sided frame having apertures in its parallel uprights, a straight bar extended through said apertures and slidably connected with the parallel vertical parts of the frame, a pointer carried at one end of the straight bar, a gage fixed to the frame to extend in alinement with said straight bar in a plane below said pointer and a slide on the bar and a hook-shaped hanger for supporting a file-holder adjustably connected with said slide, arranged and combined to operate in the manner set forth for the purposes stated.

4. A saw-filing machine consisting of a three-sided frame having apertures in its parallel uprights, a straight bar extended through said apertures and slidably connected with the parallel vertical parts of the frame, a pointer carried on the end of the straight bar, a gage extended from the frame to be engaged by said pointer, a slide on the bar and a hanger for supporting a file-holder adjustably connected with said slide, a gage fixed to the slide and a pointer fixed to the hanger, a file-holder suspended in the hanger, a saw-clamp at the lower end of said three-sided frame and means for fixing the saw-clamp to a bench, arranged and combined to operate in the manner set forth, for the purposes stated.

CHARLES E. GROVER.

Witnesses:
J. E. DIGNAN,
JOHN HEATH.